United States Patent

[11] 3,588,853

[72] Inventors Henry C. Theuerer
New York, N.Y.;
Paul A. Turner, Basking Ridge, N.J.

[21] Appl. No. 715,597
[22] Filed Mar. 25, 1968
[45] Patented June 28, 1971
[73] Assignee Bell Telephone Laboratories, Incorporated
Murray Hill, N.J.

[54] MAGNETIC WIRE
7 Claims, 7 Drawing Figs.

[52] U.S. Cl. .......... 340/174, 317/235
[51] Int. Cl. .......... G11c 11/14, G11c 19/00
[50] Field of Search .......... 340/174 (PW), 174 (TF), 172 (TF), 174 (SR); 117/234, 235

[56] References Cited

UNITED STATES PATENTS

| | | | |
|---|---|---|---|
| 3,069,661 | 12/1962 | Gianola | 340/174 |
| 3,303,117 | 2/1967 | Flur | 204/192 |
| 3,370,979 | 2/1968 | Schmeckenbecher | 117/217 |
| 3,379,539 | 4/1968 | McGrath et al. | 106/1 |
| 3,407,126 | 10/1968 | Koretzky | 204/43 |
| 3,241,126 | 3/1966 | Snyder | 340/174 |
| 3,482,225 | 12/1969 | Schweizerhof et al. | 340/174 |

*Primary Examiner*—James W. Moffitt
*Attorneys*—R. J. Guenther and Edwin B. Cave

ABSTRACT: The disclosure describes an improved form of reentrant magnetic wire for use in magnetic storage devices such as domain wall shift registers. The improvement is obtained by reducing the nonuniformities in the magnetic characteristics of the wire (found to be caused by the surface defects) by coating the wire with a thin film of the same or a similar magnetic material.

INVENTORS H. C. THEUERER
P. A. TURNER
BY [signature]
ATTORNEY

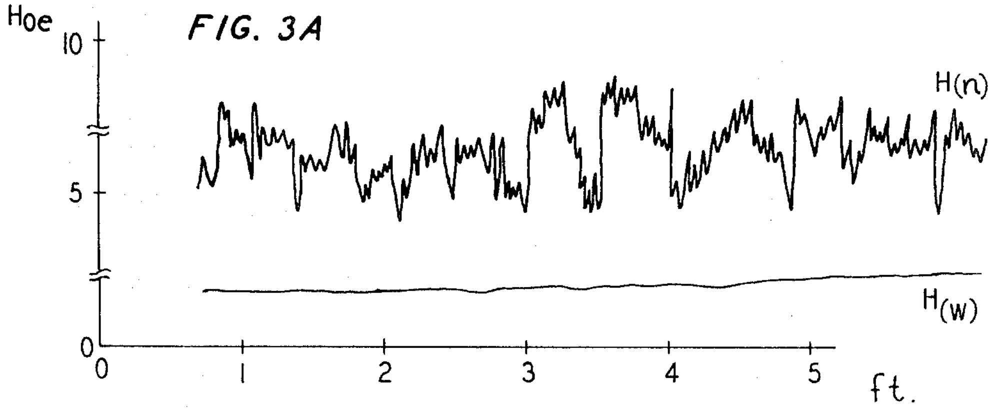
FIG. 3A
FIG. 3B 3000 Å COATING
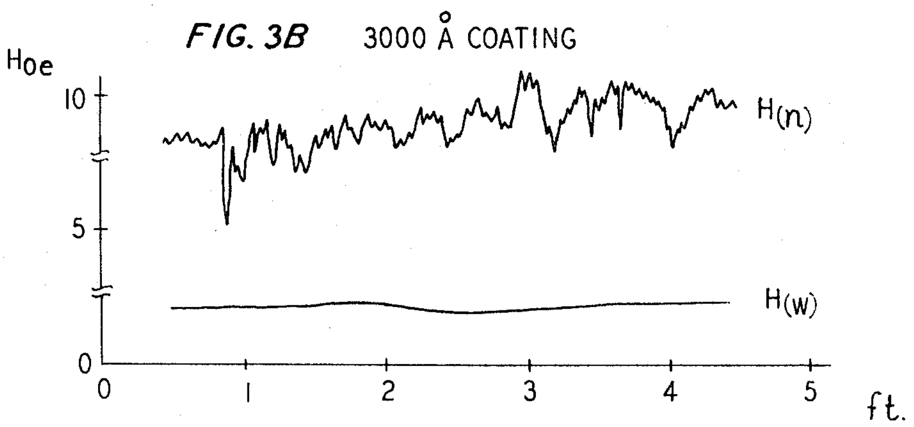
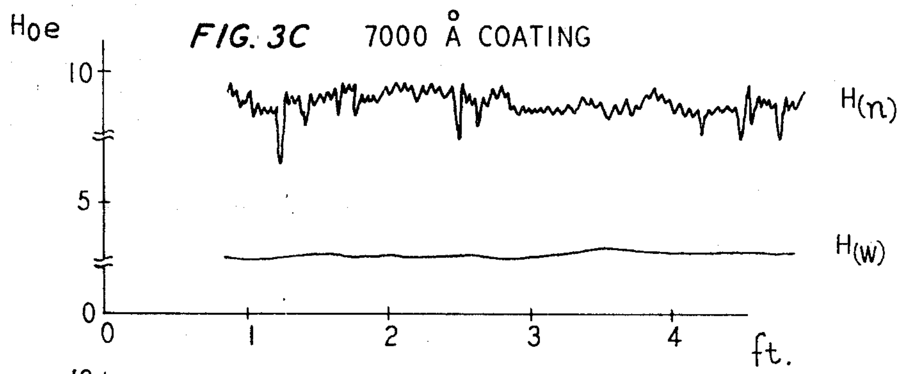
FIG. 3C 7000 Å COATING
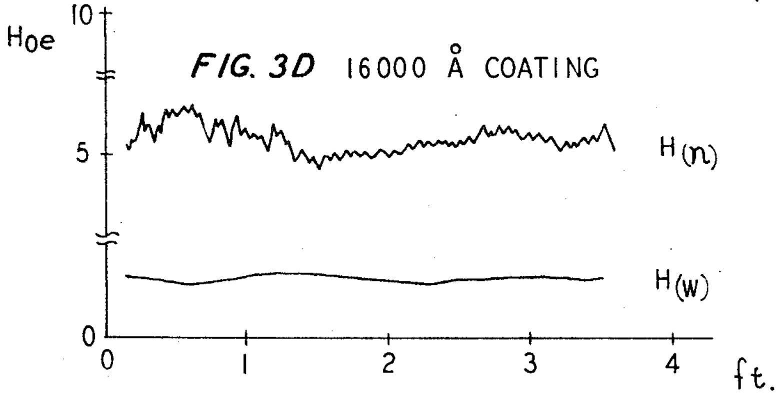
FIG. 3D 16000 Å COATING

MAGNETIC WIRE

This invention relates to magnetic information storage devices and to specially processed magnetic wire for use therein.

Electrical information handling circuits employing individual memory elements of a material having substantially nonlinear characteristics whereby the memory elements are enabled to remain in either of two stable states are well known. Such circuits are extensively represented in the art in numerous forms and may advantageously employ memory elements of a ferromagnetic material.

One well-known information handling circuit in which ferromagnetic memory elements may be employed is a shift register circuit. In such a circuit, binary information may be introduced at one point and temporarily stored or delayed by shifting it along successive information addresses to another point in the circuit by utilizing the principle of establishing and shifting magnetic domains of selected polarities through a magnetic medium.

Memory structures of this type are generally divided into a plurality of individually polarizable discrete segments, having an interaction therebetween, with a predetermined number of such segments making up each of the information addresses. Initially, the segments of each of the addresses are polarized in the same direction. An information bit such as a binary 1 for example, is introduced into a first address of the memory structure by reversing all of the segments of that address to the opposite direction, thereby establishing a pair of domain walls that can be moved continually along the magnetic medium.

Movement of the domain walls and shifting of the information bit along the memory element is accomplished by simultaneously restoring the first segment of the instant address to its initial polarization and reversing the polarization of the next segment following the last segment of the instant address. A new alignment of segments and propagation of the domain walls results and the information address has in this manner been shifted one segment portion. As an information bit is shifted along the memory element in successive phases of operation, the bit occupies a succession of overlapping or adjacent bit addresses. When the last address position of the memory element is reached, the information bit may be read out by detecting a flux change in the final segment due to the presence of the domain walls in that address. If a binary 1, for example, has been shifted to that position, each of the segments in the last address will be reversed relative to the initial polarization and this reversal of polarization may be detected as a readout signal by means well known in the art.

In general, shifting of magnetic domain walls separating two regions of opposing magnetization in a magnetic medium may be accomplished by applying a control magnetic field, H, parallel to the magnetization of that region which it is desired to expand by applying current pulses to a suitable propagation coil. The axial velocity of the resultant domain wall is proportional to (H—H$w$) wherein H$w$ is the critical field below which propagation of the wall will not occur not occur.

However, in all cases the propagating field value H$w$ must be below the field the field value H$n$ at which a new domain wall can be nucleated. Materials meeting this criterion (H$n$>H$wb$[) are said to be reentrant and several such compositions are known. An exemplary composition, an alloy of iron, nickel, silver, tin and optionally, molybdenum, is described and claimed in U.S. Pat. No. 3,365,290 issued to D. H. Smith and E. M. Tolman on Jan. 23, 1968. These materials are drawn into fine wires to form the magnetic storage element. Obviously, a large value of H$n$—H$w$ improves the margin for error. Large storage density depends on as large a wall propagation field H$w$ as possible. Consequently, these two parameters H$w$ and H$n$ have been the subject of considerable study.

It is known that the magnetic parameters of reentrant wires are often nonuniform. It has now been found that a principal reason for this nonuniformity lies in the surface condition of the wire. The presence of surface defects gives rise to localized areas where the H$n$ is inordinately low. In some cases the value of H$n$ may fall below the wall propagating field H$w$ resulting in the nucleation of a spurious domain at the point of the defect. The recognition of the source of the nonuniformities contributes to the invention described below.

The direct approach of modifying the wire-drawing procedure to improve the physical uniformity of the wire surface and thereby eliminate the nonuniformities was unsuccessful. Ultrasonic wire drawing, which is known to produce fine smooth wire with reduced tensile load, produced wire with undesirable magnetic properties probably because it does not impart sufficient residual stress to permit high uniaxial magnetic anisotropy.

According to the invention certain of the above deficiencies are overcome by depositing a thin ferromagnetic coating on the wire to compensate for the discontinuities in the wire surface. The coating should preferably be of a "soft" magnetic material, i.e., it should have a coercive force equal to or less than that of the wire. In the simplest embodiment the coating has the identical composition as the wire. By this means it has been found that the uniformity of the nucleating field along the wire is considerably improved and the figure of merit H$n$—H$w$ is also significantly increased. These objectives are achieved with a coating having an optimum thickness in the range of 3000 A. to 15,000 A.

These and other aspects of the invention may be more readily appreciated from the following detailed description. In the drawing.

Figure 4:
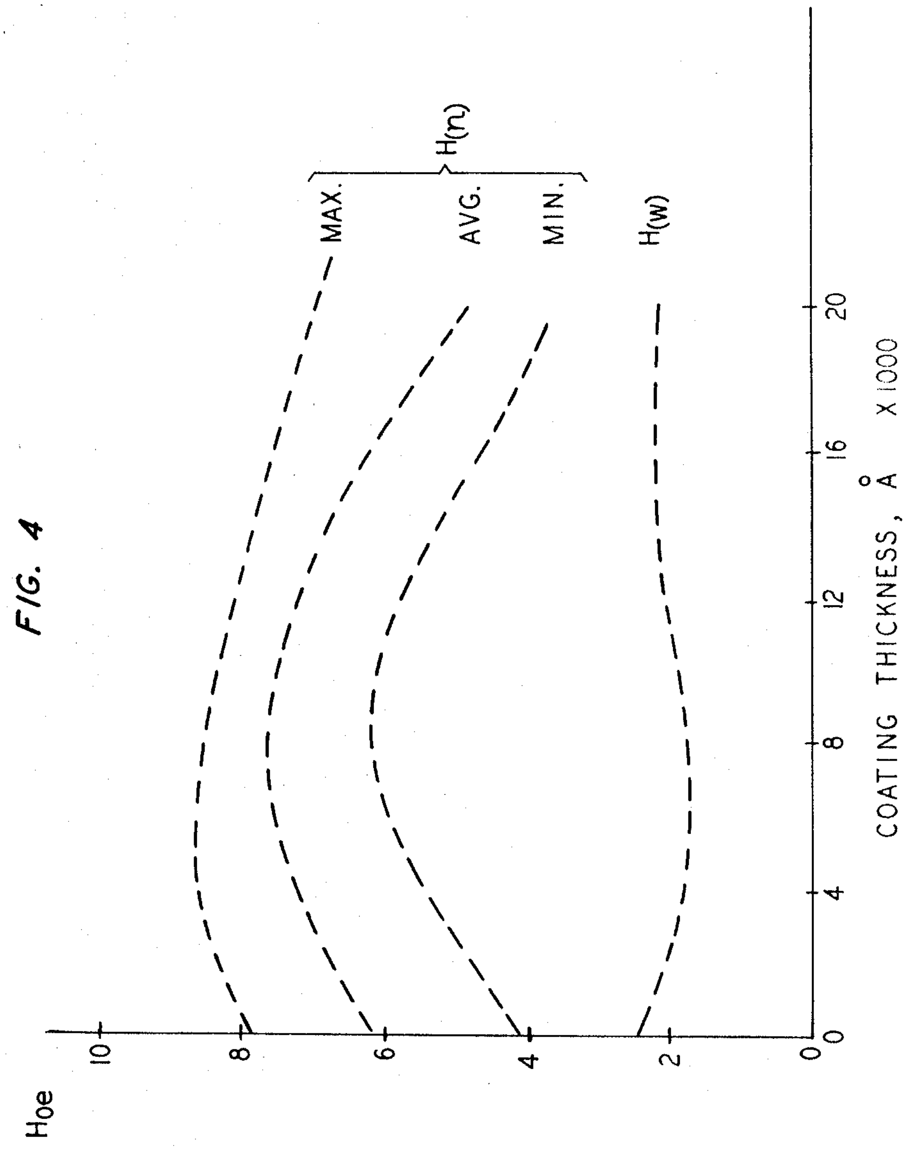

FIGS. 3A to 3D are plots of the nucleating field H$n$ and the wall propagating field H$w$ at positions along a linear wire indicated on the abscissa for uncoated wire (FIG. 3A) and for wire having various coating thickness (FIGS. 3B, 3C and 3D); and FIG. 4 is a plot of the average nucleating field H$n$ and the wall propagating field H$w$ taken along a sample wire versus the coating thickness in angstrom units to illustrate the relationship between the figure of merit, H$n$ —H$w$, and the thickness of the magnetic film.

Figure 1:
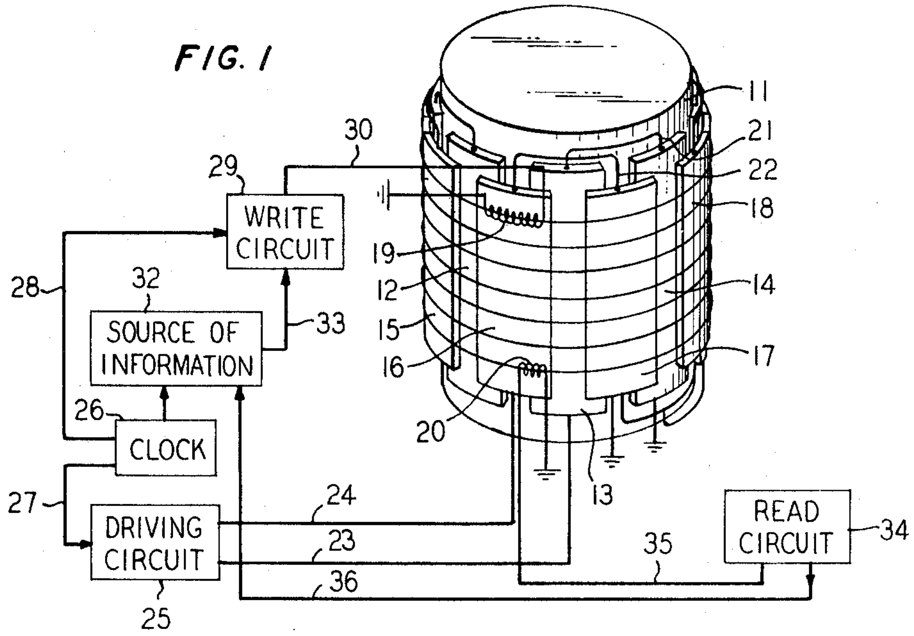
FIG. 1 is a perspective view of an exemplary domain wall shift register and associated schematic circuit which advantageously uses the improved reentrant magnetic wire of the invention.

With reference to FIG. 1, there is shown an exemplary magnetic shift register utilizing the coated magnetic wire described herein as the magnetic medium. Shown in the FIG. is a nonconductive mounting cylinder 11 having disposed thereon two overlapping groups of evenly spaced conductors parallel to the longitudinal axis of cylinder 11, such forming the polyphase conductor array. The lower or underlying portion of the conductor array comprises a plurality of flat rectangular members, for example, 12, 13 and 14, which are partially covered by the upper layer comprising rectangular-shaped members 15, 16 and 17. As shown in the FIG., the conductors are curved to conform to the circular configuration of the structural cylinder 11.

Immediately adjacent to the conductor array there is shown a magnetic wire 18 wound in a helix about cylinder 11 and comprising the coated wire described herein.

In the system being described utilizing magnetic wire 18 for each shift register channel, the recording is performed by establishing a pair of domain walls of like polarity by a write coil 19 that can be moved along continuously from one bit address to another and sensing is performed by detecting a flux change in the final segment of the wire due to the presence of the domain walls by read coil 20.

In the driving system described herein utilizing a plurality of polyphase conductors to provide a continuous circular driving field, conductors 13 and 14 and conductors 16 and 17 are connected together through leads 21 and 22, respectively, at one end. At the other end, conductors 13 and 16 are shown connected through leads 23 and 24, respectively, at one end. At the other end, conductors 13 and 16 are shown connected through leads 23 and 24, respectively, to a driving circuit 25 and conductors 14 and 17 are connected to ground. The described system also employs a clock 26 to provide timing through lead 27 to the driving circuit and through lead 28 to the write circuit 29 which is connected to write coil 19 by lead 30, the other end of coil 19 being connected to ground. Information is applied to the system from a source of information 32 through lead 33 to the write circuit 29, the source of information being timed by clock 26. The read circuit 34 is connected to read coil 20 by lead 35, the other end of coil 20 being connected to ground. Signals representing interrogated information are applied by lead 36 to the source of information 32, for example.

Figure 2:
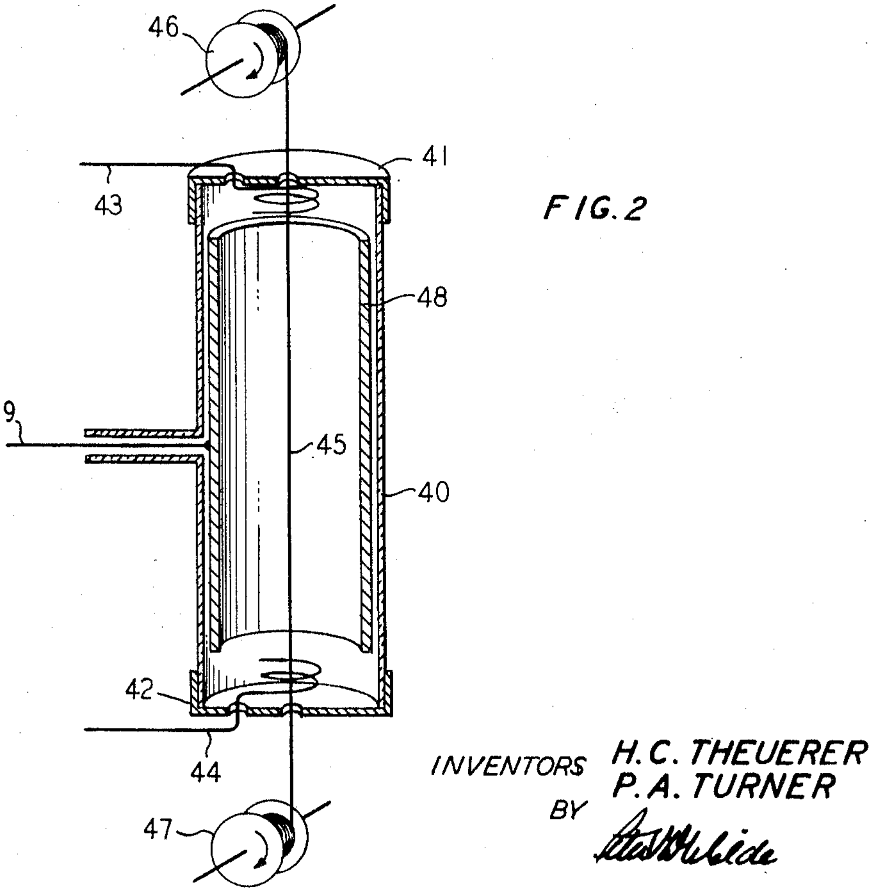
FIG. 2 is a perspective view partly in section of an apparatus useful for producing the coated magnetic wire of the invention.

The reentrant wire for use in the device just described can be prepared according to the invention as follows:

An apparatus useful for coating the wire is shown in FIG. 2. The apparatus is a sputtering system consisting of a quartz tube 40 enclosed by copper end caps 41 and 42. Openings in the end caps accommodate electrical copper wires 43 and 44 wound into spirals which serve as anode connections in the sputtering apparatus. The holes centrally located in each end cap permit the magnetic wire 45 to pass from wire spool 46 through the sputtering station to takeup reel 47. The proximity of the anode wires 43 and 44 to the magnetic wire 45 makes the wire anodic (or at ground with respect to the cathode). The cathode 48 is a cylinder of the alloy desired as the film. Electrical contact is made to the cathode through opening 49 in the quartz tube. In obtaining the data described herein the apparatus was contained in an argon atmosphere at 80—100 $\mu$. The wire 45 was 1-mil wire having the composition 79.3 Ni, 17.0 Fe, 0.7 Zr and 3.0 Nb. The cathode was 80/20–Ni/Fe. The voltage was maintained in the range of 300 to 450 volts. The spacing between the wire and the cathode was approximately five-eighths inch. The rate of travel of the wire through the sputtering station depended on the thickness of the film desired. In this particular apparatus the rate was essentially inversely proportional to the thickness, and a rate of 1.25 in./min. produced a thickness of approximately 0.4$\mu$.

In this specific embodiment the coating was produced by cathode sputtering. However, the coating may also be applied by evaporation, electroplating or other techniques.

Wire samples having three different coating thicknesses were prepared and were compared between themselves and an uncoated wire to determine the effect of the coating on the uniformity of the nucleating field H*n* along the wire. The results are given in FIGS. 3A to 3D. FIG. 3A is a plot of H*n* and H*w* along the length (indicated on the abscissa) of the uncoated wire. FIGS. 3B, 3C and 3D are similar plots for wires having 80/20–Ni/Fe coatings of 3000 A., 7000 A. and 16,000 A., respectively. It is evident that these coatings produce a significant improvement of the uniformity of the nucleating field H*n*. The wall propagating field H*w* is essentially unaffected by the coating treatment.

It is evident from FIG. 3D that as the thickness of the coating is increased the absolute value of H*n* is reduced and consequently the figure of merit, H*n*–H*w*, also declines. This effect is shown more clearly in FIG. 4 which plots the average H*n* and H*w* versus a range of coating thicknesses including those of FIGS. 3B, 3C and 3D. From this data it is concluded that the coating thickness should be maintained in the range of 3000 A. to 15,000 A. to give an approximate optimum value H*n* –H*w* of at least 3 oersteds.

While the above discussion treats specific iron-nickel alloys the invention is applicable to any magnetic element wherein surface defects interfere with the uniformity of necessary magnetic parameters. In the specific case described herein the invention is directed to reentrant magnetic wires wherein H*n*–H*w* is a critical parameter.

Various additional modifications and extensions of this invention will become apparent to those skilled in the art. All such variations and deviations which basically rely on the teachings through which this invention has advanced the art are properly considered within the spirit and scope of this invention.

We claim:

1. A magnetic element element comprising a magnetic wire and means for nucleating a magnetic domain wall in said magnetic wire the improvement which comprises the moderation of the effects of surface defects upon the uniformity of necessary magnetic parameters by the inclusion of a soft ferromagnetic coating, the coercivity of which coating is not greater than the coercivity of the magnetic wire, in direct contact with the magnetic wire the said coating having a thickness in the range of 3000 A. to 15,000 A.

2. The element of claim 1 wherein the wire consists of an alloy comprising iron and nickel.

3. A magnetic shift register storage device comprising an elongated magnetic element, means for establishing magnetic domains in said magnetic element and means for shifting said magnetic domains along said element the improvement which comprises a magnetic element composed of a reentrant magnetic wire coated with a ferromagnetic material, the coercivity of which is not greater than the coercivity of the said magnetic wire, having a thickness in the range of 3000 A. to 15,000 A. in order to moderate the effects of surface defects upon the uniformity of necessary magnetic parameters of the said wire.

4. The device of claim 3 wherein the wire and the coating consist of an alloy comprising iron and nickel.

5. A method comprising coating a magnetic wire with a soft ferromagnetic material, the coercivity of which is not greater than the coercivity of the magnetic wire, having a thickness in the range of 3000 A. to 15,000 A. in order to moderate the effects of surface defects upon the uniformity of necessary magnetic parameters of said wire.

6. The method of claim 5 wherein the wire and the coating consist of alloys comprising iron and nickel.

7. The method of claim 5 wherein the coating is applied by cathode sputtering.